United States Patent [19]

Huang

[11] Patent Number: 4,500,872
[45] Date of Patent: Feb. 19, 1985

[54] METHOD FOR ENCODING CHINESE CHARACTERS

[75] Inventor: Timothy D. Huang, Portland, Oreg.

[73] Assignee: DAI-E Systems, Inc., Portland, Oreg.

[21] Appl. No.: 359,374

[22] Filed: Mar. 18, 1982

[51] Int. Cl.³ ............................ G06F 3/02; B41J 5/00
[52] U.S. Cl. .................................. 340/365 R; 400/110
[58] Field of Search .................. 340/365 R, 365 S; 400/110; 178/30

[56] References Cited

U.S. PATENT DOCUMENTS 4,096,934 6/1978 Kirmser .............................. 400/110
4,379,288 4/1983 Leung ............................. 340/365 R

FOREIGN PATENT DOCUMENTS

2062916 5/1981 United Kingdom ................ 400/110

Primary Examiner—James J. Groody
Attorney, Agent, or Firm—Kolisch, Hartwell, Dickinson & Anderson

[57] ABSTRACT

A method of encoding, uniquely, different characters in the Chinese language. The method includes the steps of (1) associating with a selected character a phonetic tag formed with no less than one and no more than three of the recognized Chinese phonetic symbols, (2) associating with the same character a tone tag in the form of a single one of the five different recognized Chinese tone symbols, (3) further associating with the character a two-digit number tag each digit of which is associated, respectively, with two different ones of the four recognized corner configurations in the character, and (4) assembling these tags in a preselected sequence to generate a combined electronic data stream usable in a data-handling device such as a digital computer.

7 Claims, 8 Drawing Figures

METHOD FOR ENCODING CHINESE CHARACTERS

BACKGROUND AND SUMMARY OF THE INVENTION

This invention relates to a method for encoding Chinese language characters.

One of the major problems encountered over the years respecting the handling (i.e. printing, data-transmitting, etc.) of the Chinese language, has been the lack of a convenient, simple and easy-to-use input interface, such as a keyboard, for an operator. The problem results primarily from the fact that the Chinese language includes many thousands of different characters which cannot, in any reasonably practical way, be accommodated uniquely (i.e., on a one-to-one basis) on a keyboard, or other like unit. This language-handling difficulty, while present for scores of years, is felt far more acutely now in an age of high-speed data transmission utilizing digital computers. In modern-day practice, it is important that some simple and speedy method of inputting unique Chinese character information be found if users of Chinese are to have practical access to state-of-the-art data-handling and transmission systems.

In recent years, several encodation approaches have been proposed to resolve the dilemma outlined above, and the method embodied in the present invention is one which is designed to offer major improvements over such earlier-tried encoding formats.

Expressed in the simplest terms, a main thrust of the present invention is to provide a unique method for encoding the different characters in the Chinese language which can encompass, without ambiguity, the maximum number of such characters, with the minimum number of encoding steps.

An important object related to this thrust is to provide such a method which is usable in connection with a structurally conventional keyboard unit, such as a standard so-called ASCII keyboard, to generate, for each encoded character, an electronic data stream usable with a data-handling device such as a digital computer.

The particular method proposed by the invention is capable of using such a keyboard, and in fact, and in connection with this type of keyboard, requires the use of significantly less than all of the standard keys made available therein.

According to the invention, three different code "tags" are assigned to each character—one being a phonetic tag formed with no less than one and no more than three of the recognized Chinese phonetic symbols, another being a tone tag which takes the form of but a single one of the five different recognized Chinese tone symbols, and the third being a two-digit number tag, each digit of which is associated, respectively, with two different ones of the four recognized corner configurations in the selected character. These three tags are then assembled in a preselected order, and according to a preferred method of practicing the invention, are utilized to generate a combined electronic data stream of the type feedable to a device such as a digital computer.

While there are several different orders in which these three different kinds of tags can be assembled, the one which seems to be the most preferable, from the standpoint of user convenience, is as follows: phonetic tag, tone tag, then number tag. Another assembly order which appears to be nearly as convenient is one which begins with a number tag, followed by a phonetic tag, and finally a tone tag.

Addressing somewhat more specifically the three types of tags referred to above, according to the instant invention, and regardless of the "assembly" format which is chosen, a phonetic tag includes anywhere from one to three conventional Chinese phonetic symbols. In the embodiment of the invention specifically described herein, each such symbol is assigned to a different key in a conventional keyboard, and entry of the symbol is effected by a single keystroke. Regarding a tone tag, of the five recognized Chinese tone symbols, only four of these are assigned each independently to a different one of four dedicated keys in the keyboard. The fifth tone symbol, is considered to be a "default" symbol, and is entered automatically (as will be explained) in the absence of a specific keystroke entry for a tone symbol. Thus, with respect to entering a tone tag, this is done through the performance of at most one keystroke. The two-digit number tags include different combinations of the digits 0–9, inclusive. Each digit is assigned to an independent key in the keyboard discussed herein, and each is entered through the use of a single keystroke. Thus, the totality of a number tag is entered, in all instances, through the performance of two keystrokes. How, in particular, a number tag is assigned to a character is explained below.

As a consequence of the code-tagging scheme outlined above, substantially all of the many thousands of characters in the Chinese language can be entered (via a keyboard) by an operator, with no more than six, and often as few as three, keystrokes. An exception exists for certain characters which are referred to as "collision" character. More specifically, a collision situation arises whenever a particular assembled code (including phonetic tag, tone tag, and number tag) is capable of identifying more than one language character. When this condition occurs, and with the use of conventional computer programming techniques, a system utilizing the method of the invention switches immediately into what might be referred to as a "menu" mode of operation. In this mode, the system is prepared to present an operator, (as, for example, via the screen in a cathode ray tube) with a "character menu" showing, in decending order of most common use, the several "collision" characters which "respond" to the same input code. Operators especially skilled with the system of the invention will quickly memorize, in these collision cases, the "menu" order of possible characters, and, immediately after entering the initial code, will enter another single digit which indicates the position of the desired character in the menu. In a case where an operator does not have a menu memorized, by applying a keystroke to the usual space key in a keyboard, the available menu is presented visually, and thereafter the operator, using a single keystroke, enters an appropriate single designating digit.

For the sake of completeness, another "special" case should be mentioned. This case is neither one which creates a possible situation of ambiguity, nor one which requires special programming or processing in a computer-based system utilizing the invention. The case referred to is one in which a given character can be referenced through a plurality of codes dffering in phonetic and/or tone elements. Here, ambiguity is avoided directly by the operator who will know, at the time of encoding the character, precisely which phonetic and tone symbols are required to give the selected character the desired meaning.

Various other features, objects and advantages which are attained by the invention will become more fully apparent as the description which now follows is read in conjunction with the accompanying drawings.

DETAILED DESCRIPTION OF THE INVENTION

Figure 1:
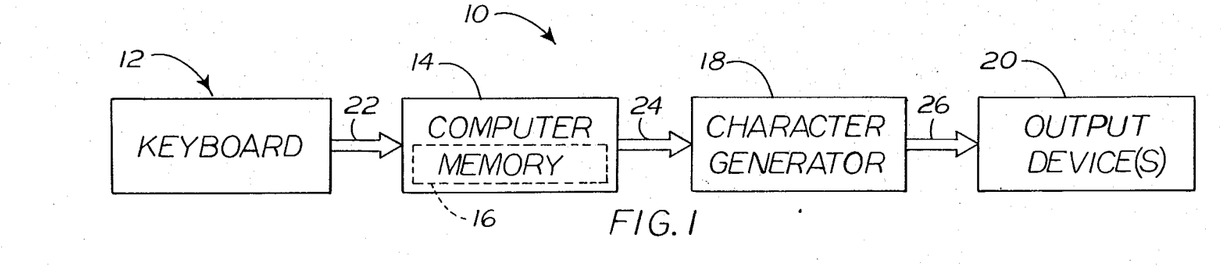
FIG. 1 is a block diagram of a digital-computer-based system employing the method of encoding Chinese characters proposed in accordance with the present invention.

Turning now to the drawings, and with reference first to FIG. 1, here there is shown generally at 10 a digital-computer-based system which employs a Chinese-language character-encoding method performed in accordance with the present invention. Included in system 10 are a conventional ASCII keyboard unit 12, a digital computer, or data-handling device, 14 including a memory indicated in dashed lines at 16, a character generator for Chinese characters 18, and an output device (or devices) generally indicated by block 20. While generator 18 could be coupled to any one or a plurality of different output devices representable by a block like block 20, such as a data-transmission line (for example a telephone line), block 20 herein includes both a cathode ray tube monitor and a high-speed printer.

As was just mentioned, keyboard 12 is designed according to the so-called ASCII standard. It includes a predetermined format of keys, depression of each of which, in accordance with the electrical condition of the keyboard, produces a binary electronic data stream uniquely related to that key, which stream it stores in an appropriate internal register for ultimate transmission, via a data bus 22, to an input port in computer 14. As will be more fully explained with reference to FIG. 2 shortly, the "active" coding keys in keyboard 12 are assigned, according to the invention, to three different basic groups, or sets, of keys. The keys in one of these sets bear on their faces, and are related to, the thirty-seven different, recognized Chinese phonetic symbols. The keys in a second set, four in number, bear on their faces, and relate to, four of the five different recognized Chinese tone symbols. The fifth such tone symbol is treated as a "default" symbol, and is related, as will be explained, to the space key in keyboard 12. The keys in the third group bear on their faces, and relate to, each of the ten recognized, single-digit, Arabic integers 0–9, inclusive.

Structurally, computer 14, memory 16 and character generator 18 are conventional, with the computer and character generator being interconnected by a conventional data bus 24. In accordance with conventional programming techniques well known by those skilled in the art, which techniques form no part of the present invention, computer 14, in conjunction with its memory 16, is programmed to recognize different predetermined sequences of data streams received over bus 22, which sequences each identify, according to the encoding method of the invention, a particular character in the Chinese language. The computer acts upon such recognition in such a manner that, through data bus 24, it instructs character generator 18, also conventionally programmed, to supply block 20 with an output data stream, via a data bus 26, which is usable to produce a direct visual artifact of a selected Chinese character through the actions of the display devices making up block 20. The organizational combination of computer 14, generator 18 and output block 20, and the manners in which they coact with one another, are conventional in the art. New, in accordance with the present invention, is the encodation technique which results in the supply of input data via bus 22 to the computer.

Figure 2:
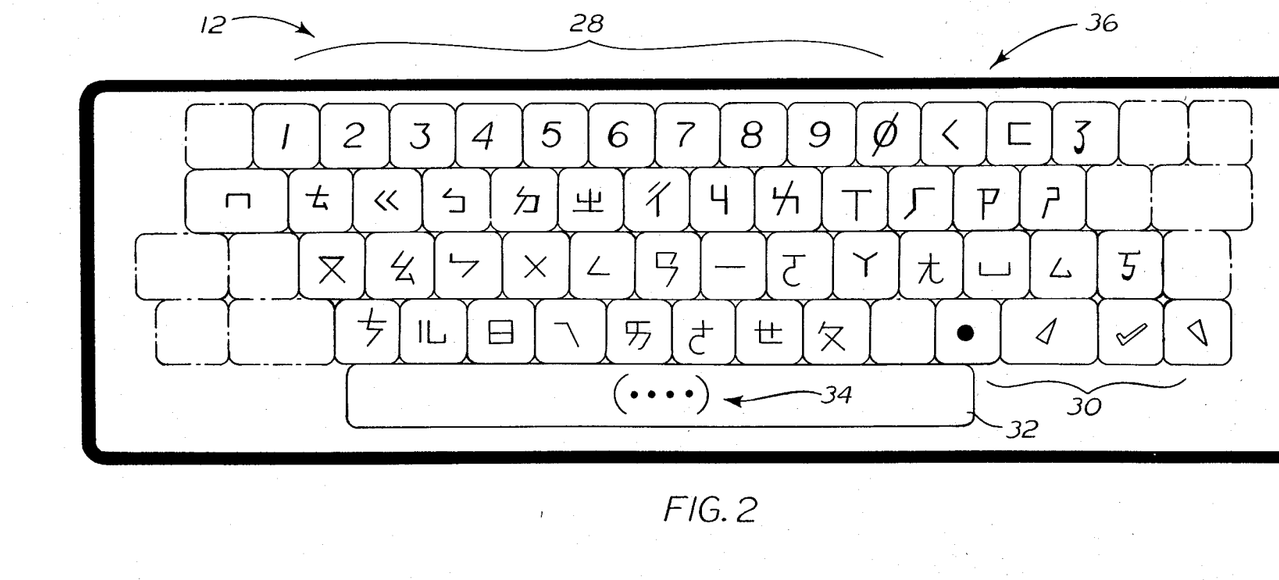
FIG. 2 is an enlarged, isolated view of a structurally-standard ASCII keyboard unit, including keys inscribed with numeric digits, and with phonetic and tone symbols, used in the system of FIG. 1.

With attention turned now to FIG. 2, the operational "face" of the keyboard is here illustrated with its usual plurality of keys shaped and located relative to one another in a well known and conventional fashion. While a particular assignment of different numbers and symbols is shown in FIG. 2 for certain ones of these keys, it will be appreciated that various other particular arrangements and assignments could be used if desired. In accordance with the assignment arrangement employed in keyboard 12, the "assigned" keys (with the exception of the "space" key) are the ones shown in solid outlines in FIG. 2, and the non-assigned, non-used keys are shown in phantom outlines.

Indicated generally by bracket 28 in FIG. 2, are the ten keys which are assigned to the ten different Arabic numeric digits 0-9, inclusive. Those which are embraced by bracket 30 at the lower right corner of the keyboard in FIG. 2, bear four of the five recognized Chinese tone symbols. Indicated at 32, and extending horizontally along the base of the keyboard, is a conventional "space" key which operates primarily herein to effect the transmission, over bus 22, of a combined electronic data stream derived from data which has been stored in the keyboard's register as a consequence of the inputting of a character designation code. The space key also, under certain operating conditions which will be described, causes the automatic insertion of what has been referred to above as the default tone symbol—which symbol is indicated within the parenthesis depicted on the key generally at 34. The remaining solid-outline keys, indicated generally at 36, of which there are thirty-seven in number, bear facial indications of, and are assigned to, different ones of the thirty-seven recognized Chinese phonetic symbols.

According to the invention disclosure which is made herein, there are two preferred organizational sequences for the code-tagging of a selected character—in the more preferred one of which there is first generated a phonetic tag, thereafter a tone tag, and finally a number tag. The slightly lesser-preferred of these two sequences begins with a number tag, follows that with a phonetic tag, and completes with a tone tag.

Describing utilization of the invention in light of the "more preferred" assembly sequence for code tags, an operator, using keyboard 12, and depending upon the selected character, enters one, two, or at most three phonetic-symbol keystrokes in an order dictated by common and well understood pronunciation for the character. Such action results in the keyboard storing what will be referred to herein as a phonetic-tag data stream in its internal register. Thereafter, if the tone nature of the character is one which is represented by one of the four keys embraced by bracket 30, the operator enters this coding information in the register by a single keystroke of the appropriate one of these keys. If the tone nature of the selected character is represented by the "default" tone symbol, this tagging operation occurs at a slightly later point in time, as will shortly be explained. Following tone tagging (or omission thereof in the case of the default tone symbol), the operator, in two keystrokes, keys into the register the two numeric digits which define, as will be explained later, the selected corner configurations of the character.

At the conclusion of the several keying operations just mentioned, the operator depresses space key 32, whereupon the entire combined data stream (from the keyboard's register) is fed to the computer, with the phonetic-tag data stream leading off, followed by the tone-tag data stream, and finally the number-tag data stream. In the situation where the tone tag is to be associated with the default tone symbol, actuation of the space key as just described causes automatic insertion, between the phonetic tag and the number tag, of a tone-tag data stream relating to this default symbol.

Computer 14 and character generator 18 then operate to transmit an appropriate output data stream to block 20, whereby a visual character artifact, as previously mentioned, is produced. This operation takes place in all cases except where collision characters are associated with the just-coded character.

Figure 5:
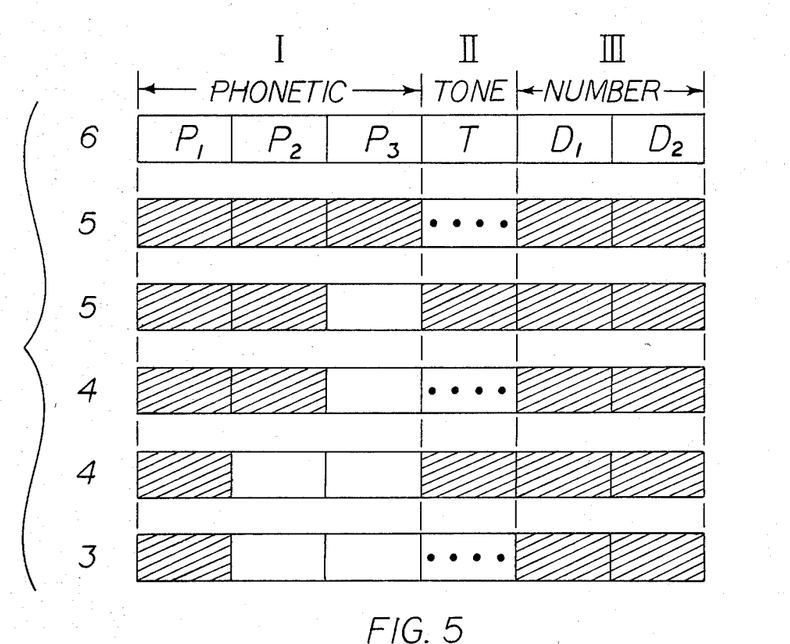
FIG. 5 shows, in six vertically spaced horizontally extending bands, the only six different basic keystroke entry sequences required, according to a preferred manner of practicing the invention, for encoding substantially all characters in the Chinese language, excepting those which have been referred to above, and which will be described below, as "collision" characters.

FIG. 5 illustrates the six different possible keying patterns which will be encountered in the encoding of virtually all characters in the Chinese language, excepting those characters which create a collision situation. Each of these six patterns is depicted in an elongate horizontal band, divided into six blocks which represent "spaces" so-to-speak for the entry of phonetic, tone and corner-number code data. To the left of each band in the figure is an Arabic number which indicates the number of keystrokes required in accordance with the pattern depicted in the band.

Progressing from the top, downwardly through FIG. 5, the uppermost band depicts a six-keystroke code pattern which utilizes three phonetic symbols, in positions $P_1$, $P_2$, $P_3$, followed by one of the four non-default tone symbols, T, followed by two corner-configuration numbers, $D_1$, $D_2$. The second band down indicates a coding pattern requiring only five keystrokes, and includes three phonetic symbols, no specifically keyed-in tone symbol, and two corner-configuration numbers. The third band down indicates another encoding pattern, also requiring but five keystrokes, including two phonetic-symbol keystrokes, one tone keystroke, and two corner-number keystrokes. The fourth band from the top shows a pattern requiring only four keystrokes. Here, the pattern begins with two phonetic keystroke entries, no tone keystroke entry, and finally two corner-number keystroke entries. The second band from the bottom in FIG. 5 shows yet another pattern requiring only four keystroke entries. This pattern includes a single phonetic entry, a single tone entry, and two corner-number entries. The lowest band in FIG. 5 shows an encoding pattern requiring only three keystrokes, including a single phonetic keystroke, no tone keystroke, and two corner-number keystrokes. As is believed will be apparent, from comments which have been made above, each of the six encoding patterns depicted in FIG. 5 is followed immediately by operation of the space key to transmit the combined code-tagging data stream to the computer.

Figure 6:
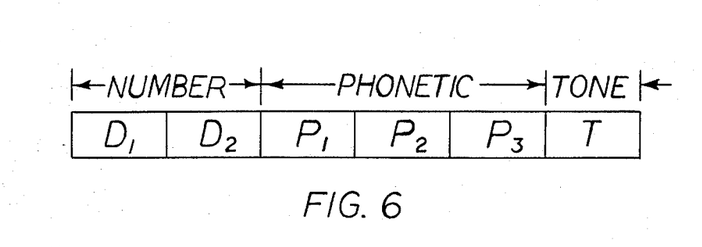
FIG. 6 is a diagram which is similar to the first (upper) horizontal band in FIG. 5, illustrating a related keystroke entry pattern based on a sequence of code tags which is different from that illustrated in FIG. 5.

Diverting attention for a moment to FIG. 6, here there is shown a coding sequence differing from that depicted in FIG. 5. In this sequence, the first two "spaces" therein receive corner-number keystroke entries, $D_1$, $D_2$; the next three spaces receive between one and three phonetic keystroke entries, $P_1$, $P_2$, $P_3$, and the final space receives a tone keystroke entry. For encoding a particular character, the phonetic, number and tone keystroke entries are identical in the patterns depicted in FIGS. 5 and 6—only the sequences thereof being different.

Figure 7:
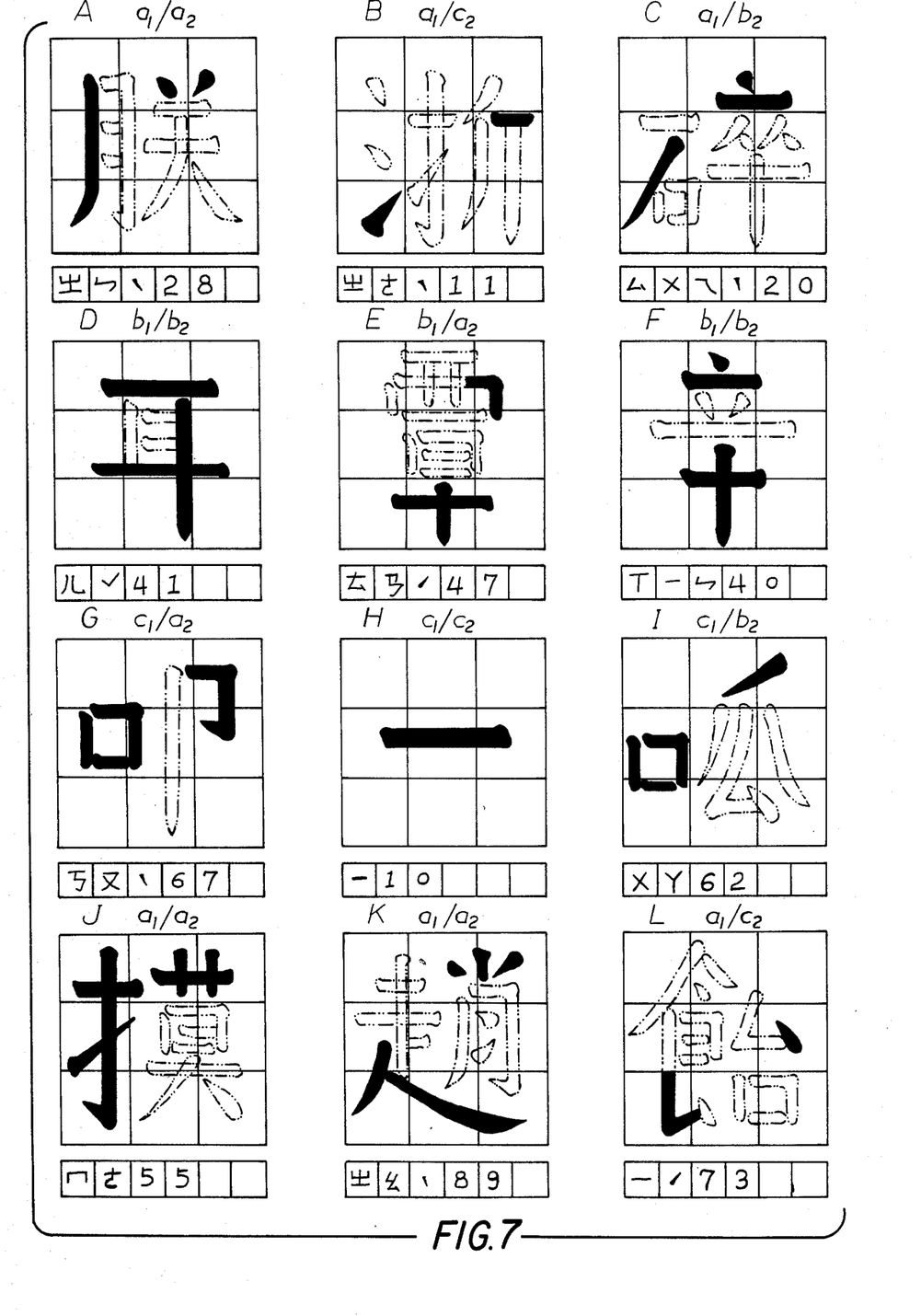
FIG. 7 consisting of FIGS. A–L, inclusive (third plate of drawings) each illustrates the application of the grid diagram of FIG. 3 to a different one of twelve different Chinese characters—with an elongated horizontal box presented at the base of each figure, divided into six squares, containing symbols and digits indicative of encoding entries used for the character depicted in the figure. Characters in these figures include both portions which are presented in darkened black form, and portions which are presented in phantom outline. The former highlight the parts of the characters which are used, according to the grid design, to assign a two-digit number tag to the character. The latter are ignored in this "assignment" process.
Figure 8:
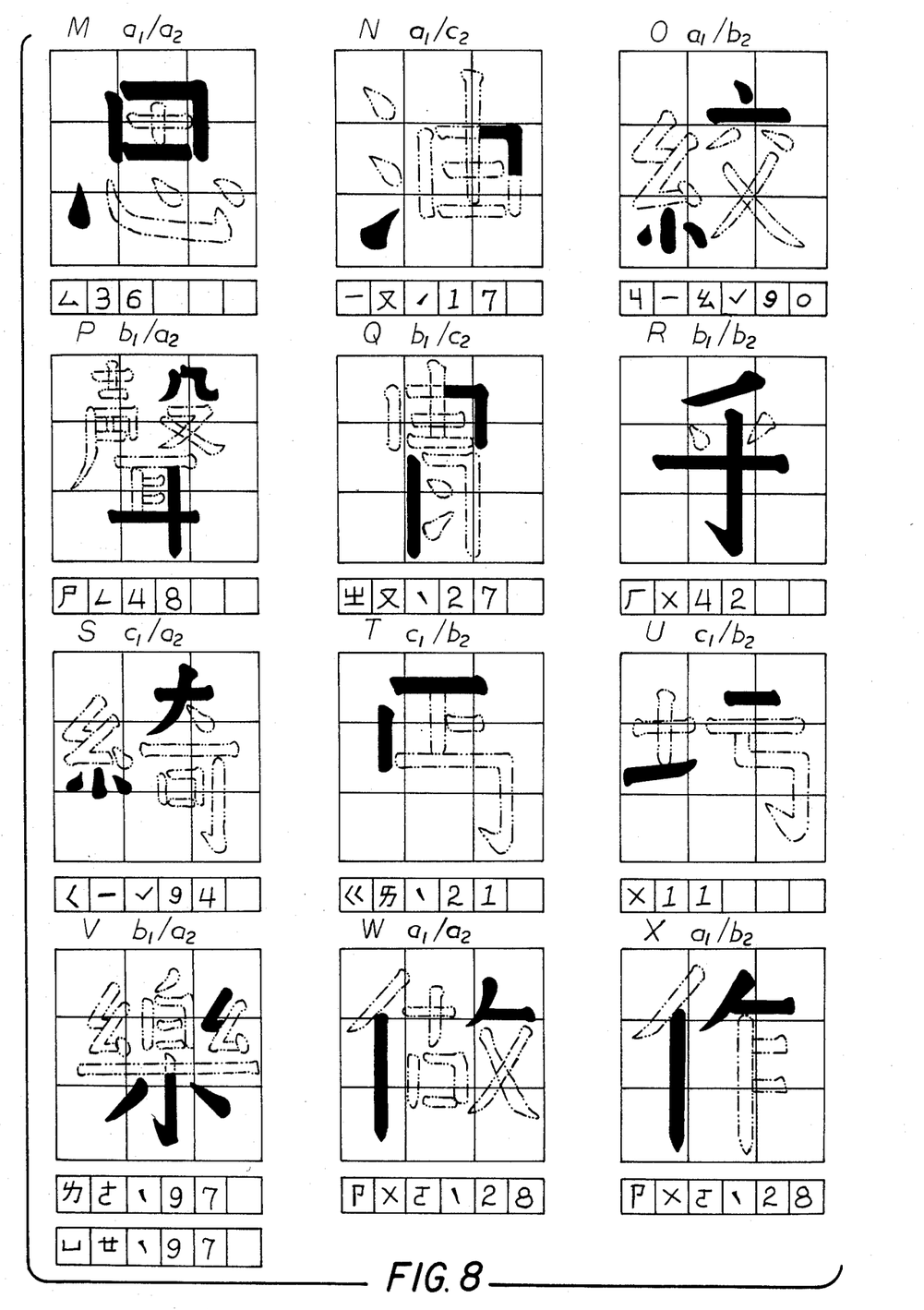
FIG. 8 consisting of FIGS. M–X, inclusive (fourth plate of drawings) are like the figures in the third plate of drawings, with the exceptions (1) that these figures relate to still another group of twelve different Chinese characters, (2) that FIG. V illustrates a situation where a single character can be designated by two different codes (which are presented in the two horizontally elongated boxes at the base of the figure), and (3) that FIGS. W and X show two different "collision" characters which are each designated by a common code (shown in the boxes at the bases of the figures).

Plates three and four in the drawings, along with TABLES I and II below, aid in an understanding of how the digits which are used for the number-tag portion of a character's code are related to the visual configurations of two corners in a selected character.

TABLE I

| DIGIT ASSIGNMENT | CORNER CONFIGURATION | NUMBER OF STROKES |
|---|---|---|
| 0 | Dot Over Horizontal | 2 |
| 1 | Horizontal | 1 |
| 2 | Vertical | 1 |
| 3 | Dot | 1 |
| 4 | Single Cross | 2 |
| 5 | Double Cross | 3+ |

TABLE I-continued

| DIGIT ASSIGNMENT | CORNER CONFIGURATION | NUMBER OF STROKES |
|---|---|---|
| 6 | Square | 3+ |
| 7 | Turn | 1 |
| 8 | V-Like | 2 |
| 9 | Arrow | 3 |

TABLE II

| CORNER SUBSQUARE REGIONS | DRAWING EXAMPLES |
|---|---|
| $a_1/a_2$ | A, J, K, M, W |
| $a_1/b_2$ | C, O, X |
| $a_1/c_2$ | B, L, N |
| $b_1/a_2$ | E, P, V |
| $b_1/b_2$ | D, F, R |
| $b_1/c_2$ | Q |
| $c_1/a_2$ | G, S |
| $c_1/b_2$ | I, T, U |
| $c_1/c_2$ | H |

Corner-configuration designation, per se, is old and well known in the art of defining Chinese characters. Generally speaking, each character can be visualized as occuping space within a geometric square which is divided by a grid pattern into nine subsquares, like the ones shown in FIGS. 3 and 4. With this visualization, the imaginary square surrounding a character can be seen to have four different corner locations, which can then be thought of as containing the four corners of the character itself. In looking at a particular corner configuration for a character, three adjacent spaces (subsquares) within the grid just described are associated with the related corner location, in a particular preferential order for identifying the nature of the selected corner. For example, and referring specifically to FIG. 3, the corner subsquare $a_1$ in the grid is, strictly speaking, the lower left corner of the overall square in FIG. 3. Associated with subsquare $a_1$, with respect to appraising the nature of the configuration of the character extending to that corner, are the immediately adjacent subsquares labeled $b_1$ and $c_1$. The letters used in designating these three subsquares in FIG. 3 indicate the priorities which they have, relative to one another, vis-a-vis identifying a corner configuration. In other words, one first looks to the nature of whatever appears in subsquare $a_1$. If that examination fails to give sufficient information to identify a corner configuration, one next looks to the contents of subsquare $b_1$. Finally, if that, too, fails to yield sufficient information, one looks to the contents of subsquare $c_1$. Explaining a bit further, diagonally opposed in FIG. 3 to the corner just discussed is the upper right corner of the square in FIG. 3. Here there are three subsquares, $a_2$, $b_2$, $c_2$ which are associated with this second corner. Again the letters a, b, c define the order of priority in which the three subsquares associated with the corner are viewed for the purpose of identifying a corner configuration.

Figure 3:
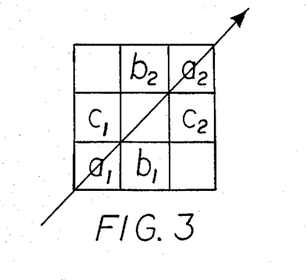
FIG. 3 is a grid diagram illustrating a preferred format for selecting two diagonally opposed corner configurations in different Chinese characters, for the purpose of assigning a two-digit number tag to such characters.

The particular statements just made with reference to FIG. 3, vis-a-vis examining the corner configuration of a Chinese character, apply to the two other corners which have not been mentioned specifically. That is to say, three subsquares are associated with each of the other two corners, with priorities for examination similarly assigned. All of what has just been said respecting the examination of corner configurations forms part of a well known Chinese character-identification technique.

One of the key features of the present invention, in a setting where character encoding includes three components (phonetic, tone, corner configurations), is the employment of only two corner-configuration digit designations which, together with phonetic and tone designations, are capable of defining, uniquely, substantially all of the characters in the Chinese language. While a coding format constructed in accordance with the invention could use any pair of two corners, the selected pair which yields the simplest and most accurate encodation is the pair made up of the lower left corner and the upper right corner. These, of course, are the two corners which are illustrated specifically with reference to FIG. 3. Further, and according to the preferred manner of practicing the present invention, the first corner configuration examined is that which appears at the lower left of a character, and the second is that which appears at the upper right of the character. Such is the significance of the arrow in FIG. 3 which, thus, indicates what might be thought of as a corner-configuration "reading direction".

Table I above sets forth, in its left-hand column, the ten digits 0-9 inclusive, in its central column, verbal identifications of the visual natures (ten in all) of different corner configurations, and in its right-hand column the number of so-called "strokes", in a drawing sense, which would be used by a Chinese calligrapher in writing such a feature. While those knowledgeable with the Chinese language will recognize clearly the appropriateness of the designations given in the central column of Table I, one note of explanation should be given with respect to the first entry which is associated with the digit 0. The point to be made here is that digit 0 is also used as the second designating digit in the case of any character where the element therein being looked at in fact comprises the whole character. An illustration of this is found in FIG. H (plate three of the drawings).

As was mentioned above in the descriptions of the drawings, plates three and four therein show, in FIGS. A-X, inclusive, twenty-four different characters laid out in a manner intended to illustrate, rather completely, the encodation method proposed by the invention. In each figure the "corner" features of the character, which are viewed for the purpose of assigning a two-digit number tag in the code for the character, are heavily darkened. Remaining portions, if any, which are not so used, are illustrated in phantom lines.

FIG. A shows a character whose corner configurations are read in the manner indicated in FIG. 3, with the particular subsquares selected for reading these configurations being those indicated at the top of the figure as $a_1/a_2$. The code used for designating the character shown is presented in the elongate box at the base of FIG. A. Five keystrokes are required. The first two, reading from left-to-right, relate to phonetic symbols; the third relates to a tone symbol; and the last two relate to the digits drawn from Table I to designate the lower left and upper right corner configurations.

FIGS. B-U, inclusive, are identical to FIG. A in "presentation format". FIG. B shows a character whose corner configurations are read in subsquares $a_1/c_2$, and the character in this figure is code-designated with a keystroke pattern which is identical, structurally, to that of the code shown in FIG. A—two phonetic symbols, one tone symbol, two digits.

FIG. C illustrates a character whose corner configurations are read in subsquares $a_1/b_2$. This character requires, for entry, a six-keystroke operation. The first three elements of the code are phonetic elements, the fourth, a tone element, and the last two, corner digits.

In FIG. D there is shown a character whose corner configurations are read in regions $b_1/b_2$. In the code for this character, which requires four keystrokes, the first keystroke enters a phonetic symbol, the second, a tone symbol, and the last two, corner digits.

In FIG. E there is a character whose encodation is structurally identical to that used for the character in FIG. A. The corner configurtations of the character in FIG. E are read from subsquares $b_1/a_2$.

FIG. F presents the first illustration of a character whose encodation utilizes what has been referred to above as the default tone symbol. The corner configurations of this character are read from subsquares $b_1/b_2$, and as can be seen at the base of the figure, five keystrokes are required to encode this character. The first three keystrokes enter phonetic symbols, and the last two enter corner digits. As explained earlier, when the space key is depressed at the conclusion of the five keystrokes used to encode this character, the default tone symbol, and more particularly, a data stream relating to it, is automatically inserted in the location between the phonetic component of the code, and the corner-digit part of the code.

FIG. G, like FIG. A, shows a character requiring a five-keystroke code entry structurally like that shown in FIG. A. The corner configurations in the character of FIG. G are read from subsquares $c_1/a_2$.

As previously mentioned, FIG. H portrays a character which is made up of but a single element. Nominally speaking, the corner configurations of this character are read in subsquares $c_1/c_2$, but because of the fact that here a single graphic element comprises the whole character, the second corner digit is given the value 0. The code for this character is entered in three keystrokes. The first enters a phonetic element, and the last two enter the corner digits. This is another case where the default tone symbol is entered automatically when the space key is depressed.

In FIG. I a character is presented whose corner configurations are read in subsquares $c_1/b_2$. Four keystrokes are required to encode this character—the first two relating to phonetic symbols, and the last two, to corner configurations. Again, the default tone symbol is brought in automatically with operation of the space key.

The code structure used for the character shown in FIG. J is structurally the same as that used for the character illustrated in FIG. I. Here, corner configurations are read in subsquares $a_1/a_2$.

Encoding of the character presented in FIG. K is the same structurally as that used for the character in FIG. A, and the corner configurations are read from like subsquares.

The character found in FIG. L is encoded in a manner much like that used for the character in FIG. D. Four keystrokes are used, with the first relating to a phonetic symbol, the second, to a tone symbol, and the third, to corner configurations, which are read from subsquares $a_1/c_2$.

From an encoding point of view, the code structure used for the character in FIG. M is structurally the same as that used for the character in FIG. H. Three keystrokes are used, with the first relating to a phonetic symbol, and the last two relating to corner configurations which are read in subsquares $a_1/a_2$. The code presented in FIG. M, like that presented in FIG. H, uses the default tone symbol.

Referring to FIGS. N–U, inclusive, these contain further illustrations of the encoding and corner-configuration-reading techniques outlined above, and shown in the several drawing figures just discussed. The codes used for the characters in FIGS. P, R and U employ the default tone symbol. In the other ones of these several figures, tone keystrokes are required during the encoding process.

FIG. V illustrates the situation where a single character can be identified by more than one code. In particular, the character shown here can be identified by each of the two five-keystroke codes shown in the boxes presented at the base of the figure. This figure illustrates the second one of the two earlier-mentioned "special" cases—and in particular, that kind of case in which no ambiguity is likely to exist. The reason for this, of course, is that the operator who is encoding the character will know, in accordance with the syntax of the expression which he is inputting, just which of the two codes is the appropriate one. As can seen in the illustration of FIG. V, the two codes differ in their phoentic elements alone. A common tone symbol is used in both cases, and, as should be expected, the same two corner digits are used—these relating to corner configurations which are read in subsquares $b_1/a_2$.

Turning attention now to FIGS. W and X, here there are shown two different characters which are represented by the identical six-element code. And, as was mentioned earlier, these two figures represent a typical collision situation. The corner configurations for the character in FIG. W are read from subsquares $a_1/a_2$, and those for the character in FIG. X are read from subsquares $a_1/b_2$.

In this collision situation, it is necessary, in order to avoid an obvious ambiguity, that the operator designate which of the two collision characters is the one which is desired. Let us assume that of these two characters, the one shown in FIG. W is more often used than the one shown in FIG. X. According to the prioritizing scheme mentioned earlier, in the "menu" operating mode of system 10, which mode is entered automatically with inputting of the code for these two characters, these two characters are considered in the system preferentially in the order of FIG. W, and then FIG. X. A typical menu for these two characters might assign, in the menu, the designating digit "one" to indicate character W, and the designating digit "two" to indicate character X. If the operator is sufficiently familiar with the coding technique of the invention and with the operation of system 10, immediately after entering the six-digit code which refers to these two characters, he may immediately perform another digit keystroke, selecting (from his memory) digit "one" or digit "two" to designate the desired character. If he does not have the menu memorized, a touch on the space bar will cause the system to present the menu visually to the operator on the cathode ray tube screen whereafter he may designate the desired character in a like manner.

Figure 4:
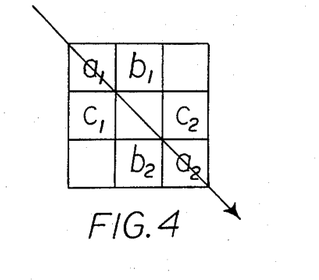
FIG. 4 is a diagram like that shown in FIG. 3—illustrating another format for number-tagging of Chinese characters.

Corner-configuration digit designation in accordance with the "reading" scheme depicted in FIG. 4 is performed in much the same manner as has just been described with reference to FIG. 3. The "reading" direction is indicated by the arrow in FIG. 4.

It is thus believed to be apparent how the encoding technique proposed by the present invention offers all of the features and advantages ascribed earlier. Through utilizing known phonetic symbols, known tone symbols, and known corner-configuration identifications, the proposed coding technique is easily used by one familiar with the Chinese language. By using the two different assemblies of phonetic, tone and corner-number tags referred to herein, and by choosing two diagonally opposed corners for identifying different language characters, a maximum number of Chinese language characters are encodable with a minimum number of keystroke operations on a keyboard. In other words, there is a maximum number of one-to-one relationships between relatively simple codes and associated characters. Significantly, and with the exception of a relatively small number of collision cases, substantially all characters in the Chinese language can be encoded with no more than six, and often as few as three, keystrokes.

While preferred manners of practicing the invention have been described herein, it is appreciated that certain variations and modifications may be made without departing from the spirit of the invention.

It is claimed and desired to be secured by Letters Patent:

1. A method of encoding, uniquely, different characters in the Chinese language comprising
   associating with a selected character a phonetic tag therefor formed with no less than one, and no more than three, recognized Chinese phonetic symbols,
   associating with such selected character a tone tag therefor comprising but a single recognized Chinese tone symbol,
   associating with such selected character a two-digit-only number tag, each digit of which is associated, respectively, with two different ones only of the four recognized corner configurations in the character, and
   assembling such tags in a preselected sequence.

2. The method of claim 1, wherein said assembling is performed to create a sequence in which the phonetic tag immediately precedes the tone tag, and the tone tag immediately precedes the number tag.

3. The method of claim 1, wherein said assembling is performed to create a sequence in which the number tag immediately precedes the phonetic tag, and the phonetic tag immediately precedes the tone tag.

4. A method of encoding, uniquely, and into a combined electronic data stream or the like, different characters in the Chinese language comprising
   associating with a selected character a phonetic tag therefor formed with no less than one, and no more than three, recognized Chinese phonetic symbols, and generating therefrom a uniquely related phonetic-tag data stream,
   associating with such selected character a toner tag therefor comprising but a single recognized Chinese tone symbol, and generally therefrom, a uniquely related tone-tag data stream,
   associating with such selected character a two-digit-only number tag, each digit of which is associated, respectively, with two different ones only of the four recognized corner configurations in the character, and generating therefrom a uniquely related number-tag data stream, and
   assembling such individual data streams into a preselected sequential order to produce such combined data stream.

5. The method of claim 4, wherein said assembling is performed to create a combined data-stream sequence in which the phonetic-tag data stream immediately precedes the tone-tag data stream, and this tone-tag data stream immediately precedes the number-tag data stream.

6. The method of claim 4, wherein said assembling is performed to create a combined data-stream sequence in which the number-tag data stream immediately precedes the phonetic-tag data stream, and the phonetic-tag data stream immediately precedes the tone-tag data stream.

7. A method utilizing a keyboard unit or the like for encoding, and transmitting discretely, and electronically, to an electronic data-handling device, each of the totality of characters in the Chinese language, excepting those characters which create a collision situation, where the keyboard unit includes (1) a set of phonetic keys, each of which is associated with a different one of the totality of the recognized Chinese phonetic symbols, (2) a set of tone keys, each of which is associated with a different one of the totality of the recognized Chinese tone symbols, and (3) a set of numeric keys, each of which is associated with a different one of the ten recognized, different, single-digit numeric integers, where such integers are associated each discretely with a different one of the ten recognized Chinese-character corner configurations, said method comprising
   generating, through the making of no more than three keystrokes of keys in such set of phonetic keys, a first electronic data stream representing the phonetic symbol(s) which relates (relate) to the selected character,
   generating, through the making of at most one keystroke of a key in such set of tone keys, a second electronic data stream representing the tone symbol which relates to the selected character,
   generating through the making of two-only keystrokes of keys in such set of numeric keys, a third electronic data stream representing the respective configurations of two different ones only of the four recognized corner configurations of such character, and
   assembling such data streams in a preselected sequence for transmission to such data-handling device.

* * * * *